United States Patent
Krafzig

(10) Patent No.: US 9,643,484 B2
(45) Date of Patent: May 9, 2017

(54) METHOD FOR OPERATING A HYBRID VEHICLE

(71) Applicant: Volkswagen Aktiengesellschaft, Wolfsburg (DE)

(72) Inventor: Benjamin Krafzig, Lehre (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/772,829

(22) PCT Filed: Feb. 21, 2014

(86) PCT No.: PCT/EP2014/053425
§ 371 (c)(1),
(2) Date: Sep. 4, 2015

(87) PCT Pub. No.: WO2014/135384
PCT Pub. Date: Sep. 12, 2014

(65) Prior Publication Data
US 2016/0016462 A1  Jan. 21, 2016

(30) Foreign Application Priority Data
Mar. 7, 2013  (DE) .......... 10 2013 003 957

(51) Int. Cl.
*B60K 15/03* (2006.01)
*B60W 20/00* (2016.01)
(Continued)

(52) U.S. Cl.
CPC .......... *B60K 15/03* (2013.01); *B60W 10/06* (2013.01); *B60W 10/08* (2013.01);
(Continued)

(58) Field of Classification Search
CPC ...... Y02T 10/6286; B60K 2015/03571; B60K 2015/03514; B60K 2015/0319;
(Continued)

(56) References Cited

U.S. PATENT DOCUMENTS 5,366,151 A * 11/1994 King ................... B60H 1/2206
237/12.3 C
5,371,412 A   12/1994 Iwashita et al. ............. 290/1 R
(Continued)

FOREIGN PATENT DOCUMENTS

CN   101224745 A   7/2008  .......... B60K 15/035
DE   10138280 A1   4/2002  ............. F02M 25/08
(Continued)

OTHER PUBLICATIONS

International Search Report from corresponding International Patent Application No. PCT/EP2014/053425, dated May 22, 2014.

*Primary Examiner* — Atul Trivedi
(74) *Attorney, Agent, or Firm* — Kusner & Jaffe

(57) ABSTRACT

A method for operating a hybrid vehicle which comprises at least one internal combustion engine with a fuel tank and a filter, and an additional motor for driving the vehicle. The filter is designed to receive fuel vapors from the fuel tank in a filtering mode and to discharge the fuel vapors to the internal combustion engine in a flushing mode. In the method, a current operating point of the internal combustion engine is detected and the flushing mode of the filter is activated according to the current operating point and an operating time of the vehicle.

16 Claims, 3 Drawing Sheets

(51) Int. Cl.
*B60W 10/06* (2006.01)
*B60W 10/08* (2006.01)
*F02M 25/08* (2006.01)
*B60W 20/15* (2016.01)
*B60K 15/035* (2006.01)

(52) U.S. Cl.
CPC ........ *B60W 20/1082* (2013.01); *B60W 20/15* (2016.01); *F02M 25/08* (2013.01); *B60K 2015/0319* (2013.01); *B60K 2015/03236* (2013.01); *B60K 2015/03514* (2013.01); *B60K 2015/03571* (2013.01); *B60W 2530/12* (2013.01); *B60W 2530/14* (2013.01); *Y02T 10/6286* (2013.01); *Y10S 903/904* (2013.01)

(58) Field of Classification Search
CPC ......... B60K 2015/03236; B60K 15/03; B60W 10/06; B60W 10/08; B60W 20/15; B60W 20/1082; B60W 2530/12; B60W 2530/14; F02M 25/08; Y10S 903/904
USPC .......................... 701/22; 180/65.28; 903/904
See application file for complete search history.

(56) References Cited

U.S. PATENT DOCUMENTS

| | | | | |
|---|---|---|---|---|
| 5,988,151 A * | 11/1999 | Schneider | ............. | F02M 25/08 123/520 |
| 6,327,852 B1 * | 12/2001 | Hirose | ................... | B60K 6/445 180/65.235 |
| 6,382,191 B1 | 5/2002 | Curran et al. | ................. | 123/518 |
| 6,557,534 B2 | 5/2003 | Robichaux et al. | .......... | 123/520 |
| 7,775,195 B2 * | 8/2010 | Schondorf | ............ | B60W 10/06 123/520 |
| 7,866,424 B2 | 1/2011 | Sauvlet et al. | ............. | 180/65.21 |
| 7,967,720 B2 | 6/2011 | Martin et al. | ..................... | 477/3 |
| 2002/0083930 A1 | 7/2002 | Robichaux et al. | .......... | 123/520 |
| 2003/0143442 A1 * | 7/2003 | Daniel | ................ | B60L 11/1894 429/423 |
| 2005/0240336 A1 * | 10/2005 | Reddy | ................. | F02D 41/0045 701/103 |
| 2006/0054143 A1 * | 3/2006 | Ludwig | ................. | F02D 41/004 123/520 |
| 2007/0289580 A1 * | 12/2007 | Potier | .............. | B60K 15/03504 123/510 |
| 2008/0271718 A1 * | 11/2008 | Schondorf | ............ | B60W 10/06 123/520 |
| 2008/0308066 A1 | 12/2008 | Martin et al. | .................. | 123/403 |
| 2009/0250122 A1 * | 10/2009 | Menke | ................. | F02M 25/089 137/511 |
| 2010/0147847 A1 * | 6/2010 | Gebert | ............ | B60K 15/03519 220/203.01 |
| 2011/0079201 A1 * | 4/2011 | Peters | ................ | F02M 25/0818 123/520 |
| 2011/0139130 A1 * | 6/2011 | Siddiqui | ............ | F02M 25/0818 123/520 |
| 2011/0251776 A1 * | 10/2011 | Bartell | ................. | F02M 69/045 701/103 |
| 2011/0315127 A1 * | 12/2011 | Jackson | .............. | F02D 41/0037 123/521 |
| 2012/0168454 A1 * | 7/2012 | Hagen | .............. | B60K 15/03519 220/746 |
| 2012/0204720 A1 * | 8/2012 | Tschantz | .......... | B60K 15/03504 95/148 |
| 2012/0215399 A1 * | 8/2012 | Jentz | ..................... | G01M 3/025 701/32.8 |
| 2013/0041539 A1 * | 2/2013 | Collet | ................... | B60L 3/0023 701/22 |
| 2013/0152905 A1 * | 6/2013 | Woods | .................... | F02M 33/04 123/520 |
| 2013/0206115 A1 * | 8/2013 | Kragh | ..................... | F02M 31/20 123/519 |
| 2013/0255645 A1 * | 10/2013 | Grass | ................ | F02M 25/0818 123/520 |
| 2014/0297163 A1 * | 10/2014 | Kragh | ................. | F02D 41/0002 701/108 |
| 2014/0374177 A1 * | 12/2014 | Yang | .................... | B60K 15/035 180/65.21 |
| 2015/0226138 A1 * | 8/2015 | Yang | .................... | B60K 15/035 701/22 |
| 2015/0322901 A1 * | 11/2015 | Kragh | ................. | F02M 25/089 123/520 |
| 2016/0185208 A1 * | 6/2016 | Hagen | .............. | B60K 15/03519 251/129.01 |

FOREIGN PATENT DOCUMENTS

| | | | | |
|---|---|---|---|---|
| DE | 10200016 | 10/2002 | ........... | B60K 15/035 |
| DE | 102007002188 | 7/2008 | ............ | B60W 20/00 |
| DE | 102008022082 | 12/2008 | ............ | B60W 20/00 |
| DE | 102007058232 | 6/2009 | ............ | F02M 25/08 |
| DE | 102008052759 A1 | 4/2010 | ............ | F02M 25/08 |
| DE | 102009035845 | 2/2011 | ............ | F02M 25/08 |
| JP | 2008-175205 | 7/2008 | ............ | F02M 25/08 |
| WO | WO2009/071382 | 6/2009 | ............ | F02M 25/08 |

* cited by examiner

METHOD FOR OPERATING A HYBRID VEHICLE

FIELD OF THE INVENTION

The present invention relates to a method for operating a hybrid vehicle, in particular to a method for flushing an activated carbon container in a hybrid vehicle. Furthermore, the present invention relates to a control apparatus for a hybrid vehicle, which control apparatus uses the method for operating the hybrid vehicle.

BACKGROUND OF THE INVENTION

Vehicles, for example passenger motor vehicles or trucks, can use what is known as a hybrid drive for driving the vehicle. The hybrid drive can comprise, for example, an internal combustion engine, such as a petrol engine or diesel engine, and an electric motor. In vehicles having a hybrid drive, what are known as hybrid vehicles, the running time of the internal combustion engine is limited. In the phases, in which the internal combustion engine is running, the load point of the internal combustion engine is as a rule comparatively high, with the result that there is only a small pressure gradient between the surroundings and the intake manifold. A pressure gradient of this type is usually used in internal combustion engines, however, to flush a filter device, for example an activated carbon container, which stores fuel gases from a tank which is assigned to the internal combustion engine. As a consequence, additional running times of the internal combustion engine are necessary, in order to achieve the necessary flushing rates for the filter. This can increase the fuel consumption or the emissions of the vehicle.

In this context, DE 10 2007 002 188 A1 discloses a hybrid vehicle having an internal combustion engine and an electric motor. The hybrid vehicle has a tank ventilating system which comprises at least one fuel tank and a suction line which leads from a filter device which can be regenerated to an intake section of the internal combustion engine. Moreover, a control apparatus is provided which can actuate various valve devices in order to flush the filter device, with the result that ambient air can be fed to the internal combustion engine through the filter device and the suction line. The control device is additionally configured in such a way that, in the case of pure electric operation of the hybrid vehicle, it switches on the internal combustion engine depending on a loading state of the filter device or a flushing gas concentration.

DE 102 00 016 B4 relates to a method and system for flushing a container for a vehicle with a hybrid drive. The hybrid drive comprises an internal combustion engine and an electric motor. As soon as it is determined that a flushing operation is required, the engine is switched on if it is not already switched on and is instructed to operate at low positions of the throttle valve, with the result that there is more vacuum in the intake manifold, in order to suck in the fuel vapor.

SUMMARY OF THE INVENTION

It is therefore an object of the present invention to provide an improved method for flushing a fuel vapor filter, in particular an activated carbon filter, for a hybrid vehicle.

According to the present invention, this object is achieved by way of a method for operating a hybrid vehicle as claimed and a control apparatus for a hybrid vehicle as claimed. The dependent claims define preferred and advantageous embodiments of the invention.

According to the present invention, a method for operating a hybrid vehicle is provided. The hybrid vehicle comprises an internal combustion engine, for example a petrol engine or a diesel engine. Furthermore, the hybrid vehicle comprises a tank which is assigned to the internal combustion engine and a filter, for example an activated carbon filter in an activated carbon container. The filter is configured to absorb fuel vapors from the fuel tank in a filter operating mode and to emit the absorbed fuel vapors to the internal combustion engine in a flushing operating mode. Furthermore, the hybrid vehicle comprises a further motor, for example an electric motor, for driving the vehicle. In the method, a current operating point of the internal combustion engine is detected and the flushing operating mode of the filter is activated depending on the current operating point and an operating time of the vehicle. The current operating points of the internal combustion engine are determined, for example, by way of a propulsion requirement which is set by a driver of the vehicle, for example, via an accelerator pedal, and a charge state of the drive battery for the electric motor. Operating points can therefore occur during normal operation of the hybrid vehicle, at which operating points flushing of the filter or activated carbon container can be carried out without changing the operating point of the internal combustion engine specifically for the flushing. By way of continuous detection of the current operating point, the operating points of the internal combustion engine which are suitable for the flushing can be utilized directly. These can be, for example, defined speeds or acceleration phases. If the driver does not reach an operating point which is suitable for the flushing operating mode of the filter within a defined time, an operating point range, what is known as a load point spectrum, can be defined, in which the flushing operating mode of the filter is activated although said region is suitable for the flushing operating mode only to a limited extent and the internal combustion engine therefore has to be operated possibly with modified operating parameters during the flushing, in order to ensure the flushing. As the operating time of the vehicle passes, said operating point range can be broadened, with the result that, as the operating time passes, the probability increases more and more that the driver will set the vehicle to an operating point within the operating point range. Finally, the operating point range can be broadened to such an extent that the internal combustion engine can even explicitly be switched on, in order to activate the flushing operating mode. These additional running times of the internal combustion engine can be avoided substantially, however, since operating points which were previously already suitable for the flushing operating mode are generally reached at least within the broadened operating point range. Additional running times of the internal combustion engine can therefore be avoided substantially and the flushing operating mode can be moved into driving states, in which the degree of efficiency of the overall system of the hybrid vehicle is not impaired substantially.

According to one embodiment, the operating time comprises an operating time since a previous activation of the flushing operating mode. As an alternative or in addition, the operating time can be an operating time since a previous start of the vehicle. Furthermore, as an alternative or in addition, the operating time can be an operating time since a previous refueling operation of the fuel tank of the vehicle. During operation of the hybrid vehicle, fuel vapors can be produced, for example, as a result of movements of the fuel in the tank or temperature changes, which fuel vapors are collected in the filter. The consideration of the operating time since a previous activation of the flushing operating mode can ensure that the filter is flushed before it is full and cannot absorb any further fuel vapors. In this way, it can be avoided that fuel vapors escape from the entire fuel system. If the vehicle is switched off, fuel vapors can be produced, for example, as a consequence of temperature fluctuations in the fuel tank. Said fuel vapors are absorbed by the filter in the activated carbon container. It can therefore be necessary after starting up of the vehicle to flush the filter, in order to reliably prevent an escape of fuel vapors from the fuel system. A flushing operation can be initiated in good time as a result of consideration of the operating time since the starting of the vehicle, that is to say as a result of consideration of the operating time since the vehicle was last switched on. During refueling of the fuel tank, fuel vapors can be produced as a result of the change in volume, which fuel vapors are absorbed in the filter. It can therefore be necessary after refueling of the vehicle to flush the filter as soon as possible, in order to avoid an escape of fuel vapors into the environment.

According to a further embodiment, a change in an operating parameter of the internal combustion engine, while the flushing operating mode is active or while the flushing operating mode is activated, is detected in the method and a loading state of the filter is determined depending on the change in the operating parameter. The operating parameter of the internal combustion engine can comprise, for example, an output of a lambda probe or lambda control system of the engine electronics. In the flushing operating mode, the fuel vapors which are bound in the filter are released and are fed to the internal combustion engine for combustion. As a result, the mixture composition changes for the internal combustion engine. This change in the mixture composition can be detected, for example, with the aid of the lambda probe in the exhaust gas section of the internal combustion engine. Since the mixture composition is corrected by the engine electronics of the internal combustion engine, an output of the engine electronics can also be used to determine the effect of the fuel vapors from the filter on the fuel composition. The fuller the filter, the more concentrated the exhaust gas vapors in the air which is sucked in by the filter. A conclusion can therefore be made about the loading state of the filter via the composition of the fuel mixture or a change in the composition of the fuel mixture.

The flushing operating mode can be activated again depending on the loading state of the filter, which loading state was determined during a previous activation of the flushing operating mode. In other words, the loading state of the filter can be determined during flushing of the filter and the flushing operation can then be interrupted because, for example, the vehicle is operated at an operating point which is unsuitable for the flushing operating mode. Depending on the loading state which is determined in this way and, for example, an operating time since the determining of the loading state, the flushing operating mode can be activated at a following later time when the vehicle, for example, is at a more suitable operating point for the flushing operating mode. This means that first of all the loading of the filter is determined, for example, by way of a short flushing operation in a less optimum operating state of the vehicle, and then one or more further flushing operations are carried out at more favorable operating points of the internal combustion engine on the basis of the knowledge about the current loading of the filter. During each flushing operation, the current loading of the filter can once again be determined, in order to avoid saturation of the filter and nevertheless to flush the filter as far as possible only at optimum operating points of the internal combustion engine, for example operating points of the internal combustion engine which are favorable in terms of consumption.

According to a further embodiment, during the active flushing operating mode, a load distribution is set between the internal combustion engine and the further motor, for example an electric motor, depending on the loading state of the filter. If, for example, the internal combustion engine is operated at an operating point which is less suitable for the flushing operating mode from the point of view of the overall drive of the vehicle and at the same time there is the requirement for flushing of the filter, a load distribution between the internal combustion engine and the electric motor can be shifted, for example, in such a way that the performance of the internal combustion engine is set, for example, to performance close to the intake full load and performance which is now excessive of the internal combustion engine is used by the electric motor to charge the batteries of the vehicle or missing performance is provided by the electric motor. Rapid and effective flushing of the filter is possible close to the intake full load.

According to a further embodiment, during the active flushing operating mode, the load distribution can be set between the internal combustion engine and the further motor depending on the operating time of the vehicle and, as an alternative or in addition, depending on the current operating point of the internal combustion engine. As a result, if the flushing operating mode is set, rapid and effective flushing of the filter can be provided. In the case of a change in the load distribution between the internal combustion engine and the further motor, the performance of the internal combustion engine can be increased or reduced, for example, and at the same time the performance of the further motor, for example of an electric motor, can be correspondingly reduced or increased. As a result, the driving performance which is requested by the driver can be provided with favorable consumption and at the same time the filter can be flushed effectively.

As described above, the flushing operating mode can be activated by an operating point range being determined depending on the operating time of the vehicle and the flushing operating mode being activated if the current operating point of the internal combustion engine lies in the operating point range. The operating point range can be broadened or increased as the operating time passes, with the result that an activation of the flushing operating mode becomes more probable as the operating time passes. At the beginning of the operating time, for example after a last activation of the flushing operating mode, starting of the vehicle or refueling of the vehicle, a narrow operating point range can be used which is increased as the operating time passes. A priority of the flushing operating mode can therefore be increased via broadening of the operating point range.

According to a further embodiment, a driving performance requirement of a driver or user of the vehicle made of the hybrid vehicle is detected. The driving performance requirement can be detected, for example, via an accelerator pedal of the vehicle or a desired speed of the vehicle. The flushing operating mode of the filter is activated depending on the performance requirement. For example, the flushing operating mode of the filter can be activated if the vehicle exceeds a predefined speed or a predefined acceleration value on account of the driving performance requirement. In the case of a hybrid vehicle having an internal combustion engine and an electric motor, a driver usually expects that the vehicle operates mainly in the electric mode in the lower speed range and in the case of low accelerations. At higher speeds or high acceleration requirements, in contrast, the driver is used to the internal combustion engine being switched on in addition. This is utilized in the method, by the flushing operating mode of the filter being activated if driving performance requirements of this type occur, that is to say, for example, the vehicle is operated at a speed of more than 60 km/h or great acceleration is required, for example with a completely depressed accelerator pedal.

Furthermore, a control apparatus for a hybrid vehicle is provided according to the present invention. The hybrid vehicle comprises at least one internal combustion engine with a fuel tank and a filter, and a further motor for driving the vehicle. The further motor can be, for example, an electric motor. The filter can be, for example, an activated carbon filter and can be capable of absorbing fuel vapors from the fuel tank in a filter operating mode and of emitting the fuel vapors to the internal combustion engine in a flushing operating mode. The control apparatus is capable of detecting a current operating point of the internal combustion engine and of activating the flushing operating mode of the filter depending on the current operating point of the internal combustion engine and an operating time of the vehicle. The control apparatus is therefore suitable for carrying out the above-described method or one of its embodiments and therefore also comprises the above-described advantages.

Furthermore, a hybrid vehicle which comprises the above-described control apparatus is provided according to the present invention. The control apparatus can be coupled, for example, to a valve which is arranged in a connection between a container of the filter and an exhaust gas section of the internal combustion engine. In order to activate the flushing operating mode of the filter, the control apparatus can open the valve, for example, in order to suck fuel vapors out of the filter by means of a vacuum which is situated in the intake section.

BRIEF DESCRIPTION OF THE DRAWINGS

The present invention will be described in detail in the following text with reference to the drawings, in which.

DETAILED DESCRIPTION OF THE INVENTION

Figure 1:
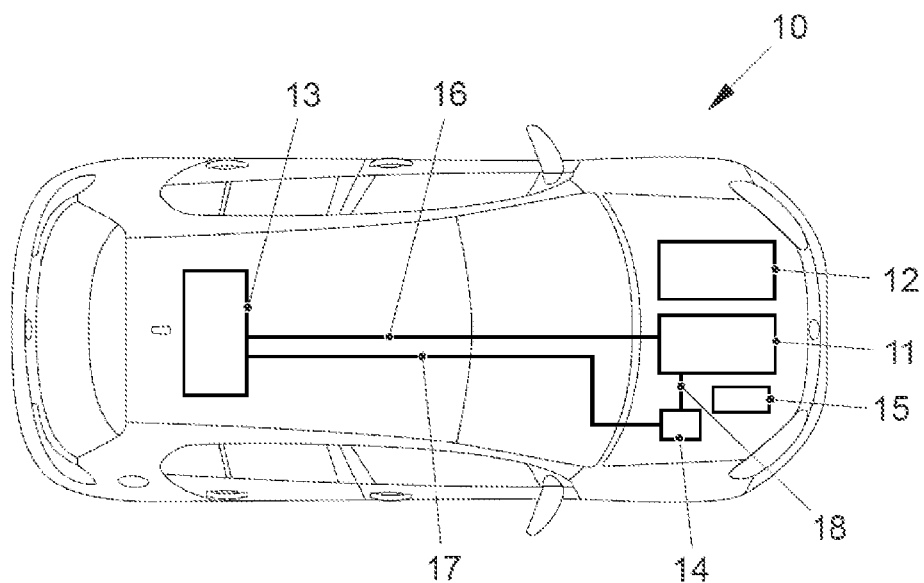
FIG. 1 shows a vehicle according to one embodiment of the present invention.

In vehicles, in particular in vehicles with petrol engines, fuel vapors which are produced are collected from the tank in activated carbon containers (ACC), in order to prevent an outflow into the environment. The fuel vapors are discharged by way of flushing of the activated carbon container and are fed to the combustion by way of the engine. This usually takes place via what is known as tank ventilation, air being flushed through the activated carbon container, which air is fed to the combustion via a line and a tank ventilating valve. As long as there is a vacuum in the intake region of the engine, said flushing can be carried out directly with the aid of the vacuum. In the supercharged region of a turbocharged or compressor engine, the flushing can take place, for example, with the aid of a venturi nozzle. Here, the necessary flushing rates depend in each case on the ambient conditions, such as, for example, the pressure or temperature, and the properties of the fuel which is used. The possible flushing rates, that is to say the possibilities of flushing, depend primarily on the operating point of the internal combustion engine, since the internal combustion engine has to be capable at said operating point of burning the fuel gases which are fed from the tank ventilating means at the predefined air ratio without reaching the combustion limits. In particular, overenrichment of the mixture is to be avoided. Moreover, the possible flushing rate also arises from the pressure ratios between the ambient pressure and the intake manifold pressure or pressure at the venturi nozzle. At an operating point with a high load, the pressure difference between ambient pressure and intake manifold pressure can be too low for effective flushing, in particular if a turbocharger or compressor increases the pressure in the intake section. At operating points in the lower load range, there is the possibility of overenrichment of the mixture, since the injection systems usually provide a minimum injection quantity which, in conjunction with the fuel vapors from the activated carbon container, can lead to overenrichment of the mixture. A suitable range for flushing of the activated carbon container is therefore a relatively high load with a nevertheless existing pressure gradient with respect to the intake manifold, for example close to the intake full load, for example from 10 to 30% below the intake full load, a pressure of from 800 to 900 mbar prevailing in the intake section, for example.

The running time of the internal combustion engine is limited in hybrid vehicles. In phases, in which the internal combustion engine is active, the load point is as a rule comparatively high and therefore unfavorable for the flushing of the activated carbon container. As a result, problems can arise in meeting the required legal emission limit values, or an increase in the running time of the internal combustion engine is necessary. This can lead to an operating behavior of the hybrid vehicle which is implausible or undesired for a driver of the hybrid vehicle. Furthermore, the increase in the running time of the internal combustion engine can lead to an increase in the fuel consumption. The method which is described in the following text for a hybrid vehicle contributes to avoiding said disadvantages.

FIG. 1 shows a hybrid vehicle 10 having an internal combustion engine 11 and an electric motor 12. Fuel for the internal combustion engine 11 is stored in a fuel tank 13 and is fed to the internal combustion engine 11 via a fuel line 16. A ventilating line 17 is coupled to an activated carbon container 14, in order to guide fuel vapors which are produced in the fuel tank 13 into the activated carbon container 14. A filter material in the activated carbon container 14, for example activated carbon, absorbs the fuel vapors, in order to avoid an escape of the fuel vapors into the environment. In order to avoid fuel vapors passing into the environment in the case of saturated activated carbon, the activated carbon container 14 can be flushed. During flushing of the activated carbon container, fresh air is introduced into the activated carbon container 14 and is sucked via a connection 18 into an intake section of the internal combustion engine, in order to be burned in the internal combustion engine 11. Furthermore, the hybrid vehicle 10 comprises a control apparatus 15 which controls the flushing of the activated carbon container 14.

Figure 2:
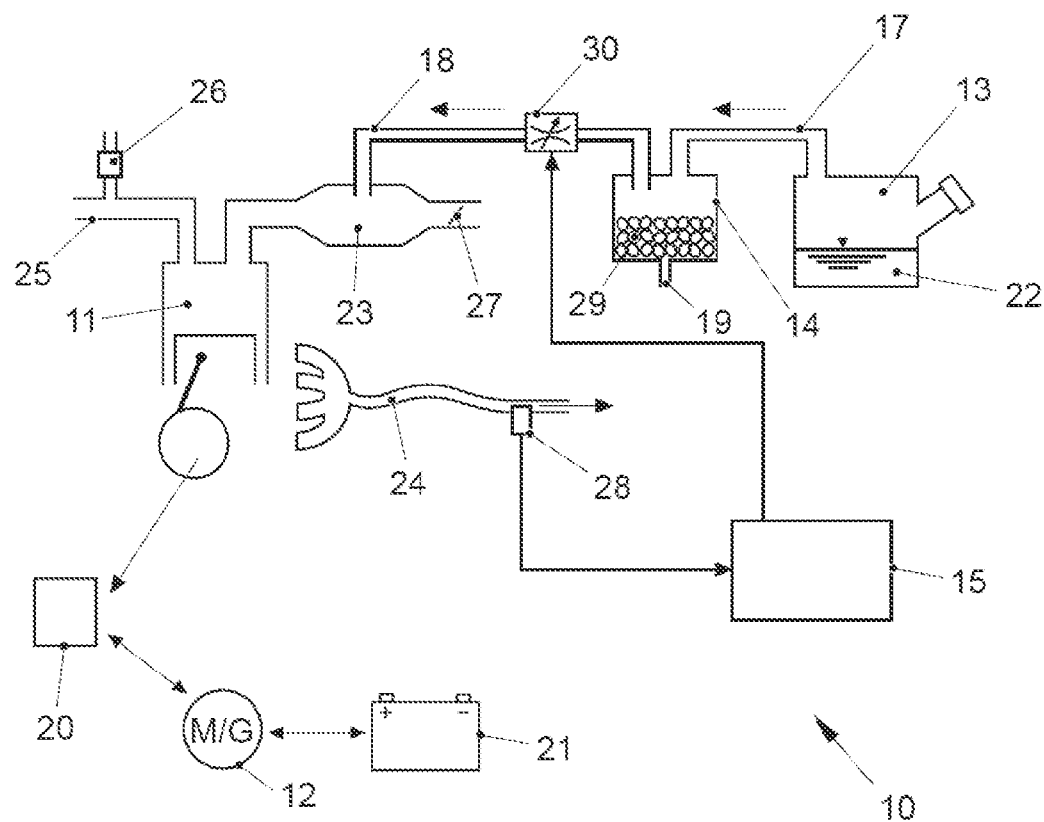
FIG. 2 diagrammatically shows components of a vehicle according to one embodiment of the present invention.

FIG. 2 shows components of the hybrid vehicle 10 in detail. The internal combustion engine 11 and the electric motor 12 act jointly on a drive 20 of the hybrid vehicle 10. The internal combustion engine 11 is supplied with fuel 22 from the fuel tank 13. The electric motor 12 is supplied with electrical energy from a battery 21. Furthermore, the electric motor 12 can also operate as a generator, and can convert mechanical energy from the drive engine 11 or the drive 20 in a generator mode into electrical energy which can be conducted into the battery 21 for storage. The internal combustion engine 11 comprises an intake section 23 with a throttle valve 27, an exhaust gas section 24 with a lambda probe 28, and a fuel feed means 25 with an injection valve 26. The fuel feed means 25 is coupled, for example, via a fuel pump to the fuel tank 13.

Figure 3:
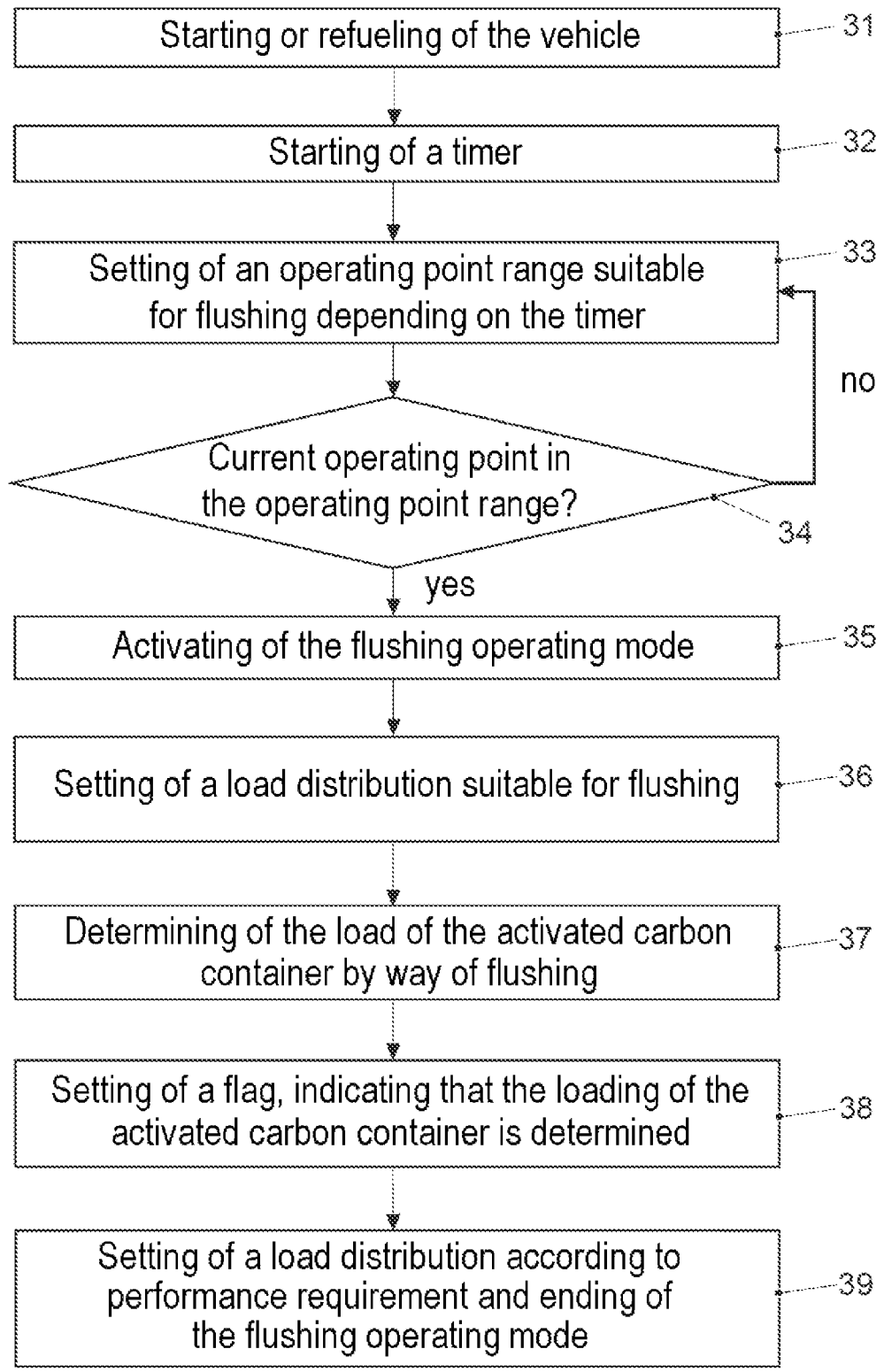
FIG. 3 shows method steps of a method according to one embodiment of the present invention.
Figure 4:
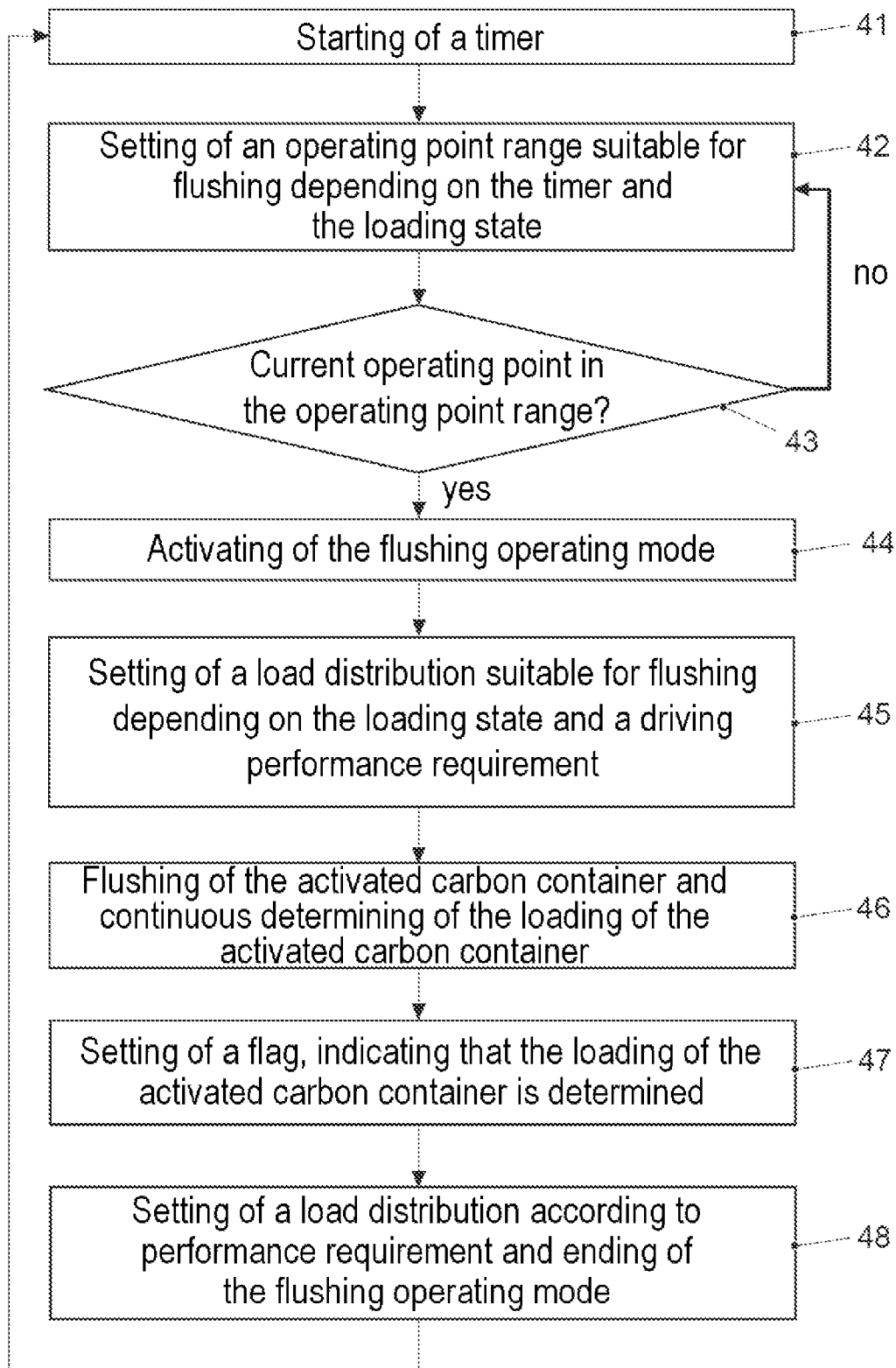
FIG. 4 shows method steps of a method according to a further embodiment of the present invention.

The injection valve 26 determines the fuel quantity which is fed by the fuel line 25. The fuel tank 13 is coupled via the tank ventilating line 17 to the activated carbon container 14. The activated carbon container 14 has an opening 19 which provides a connection to ambient air. If fuel vapors are formed in the fuel tank 13, for example in the case of a temperature increase, said fuel vapors are guided via the ventilating line 17 into the activated carbon container 14, in order to avoid an excess pressure in the fuel tank 13, or in order to limit said excess pressure, for example, in a pressurized tank system. The fuel vapors are absorbed in activated carbon 29 in the activated carbon container 14, with the result that only air which is free from fuel vapors can escape into the environment via the opening 19. The fuel vapor quantity which can be absorbed by the activated carbon 29 is limited. In order to avoid fuel vapors passing into the environment via the opening 19, it is necessary to flush the activated carbon 29 with fresh air and thus to free it from the fuel vapors. To this end, the activated carbon container 14 is coupled via the line 18, in which a valve 30 is arranged, to the intake section 23 of the internal combustion engine 11. If a vacuum prevails in the intake section 23 and the valve 30 is opened, ambient air is sucked through the opening 19 and through the activated carbon 29, as a result of which the fuel vapors are removed from the activated carbon 29 and are fed to the intake section 23. From there, the fuel vapors pass into the internal combustion engine 11 and are burned there. With the aid of the lambda probe 28 in the exhaust gas section 24, the mixture composition of the fuel/air mixture which is fed to the internal combustion engine 11 can be tested and the fuel/air mixture is optionally adjusted correspondingly by an engine electronics system, in order to maintain stipulated exhaust gas values. The control apparatus 15 is coupled to the lambda probe 28 and the valve 30. Furthermore, the control apparatus 15 can be coupled to an engine electronics system (not shown) of the internal combustion engine 11, in order, for example, to detect a current operating state of the internal combustion engine 11 or to detect a performance requirement made of the internal combustion engine 11, which performance requirement is required, for example, by a driver of the vehicle via the accelerator pedal. The method of operation of the apparatus 15 will be described in detail in the following text with reference to FIGS. 3 and 4. In particular, the method of operation of the control apparatus 15 is broken down into two parts, a first part, in which loading of the activated carbon container 14 with fuel vapors is determined (FIG. 3), and a second part, in which the actual flushing of the activated carbon container 14 is carried out (FIG. 4).

First of all, the loading of the activated carbon container with fuel vapors is determined or acquired. To this end, a suitable operating point for the determination of the loading is sought after production of the operational readiness of the vehicle or after a fueling stop of the vehicle in step 31. Said operating point ideally lies in a range, in which the driver is already operating the engine as a result of his/her propulsion requirement under conditions which are favorable for the flushing and therefore for the acquiring of the loading of the activated carbon container. This might be, for example, a defined speed, for example a speed of more than 60 km/h, or an acceleration phase with at least one predefined acceleration. To this end, a timer is started in step 32 and an operating point range which is suitable for flushing is set depending on the timer in step 33. A comparatively narrow range is first of all selected as operating point range, which narrow range provides favorable conditions for the flushing and therefore for the acquiring of the loading of the activated carbon container. A check is made in step 34 as to whether a current operating point of the internal combustion engine lies in the operating point range. If the driver does not achieve a suitable point for flushing and acquiring the loading within a defined time, the operating point range is broadened in step 33. This loop, consisting of steps 33 and 34, is run through as time passes until the operating point range is so broad that acquiring of the loading is enforced after a defined time. In the extreme case, this can also lead to forced starting of the internal combustion engine. It is prevented as a result that the activated carbon container spills over and can therefore emit fuel vapors to the environment. If it is determined in step 34 that the current operating point of the internal combustion engine lies in the timer-dependent operating point range, the flushing operating mode for the activated carbon 29 in the activated carbon container 14 is activated in step 35, that is to say the valve 30 in FIG. 2 is opened. As soon as the loading detection, that is to say the flushing of the activated carbon container has begun, the internal combustion engine is held in an operating range which is favorable for the flushing by way of an active load point distribution of the load between the internal combustion engine 11 and the electric motor 12 (step 36). Said operating range lies as a rule somewhat below the intake full load of the internal combustion engine, since the greatest flushing rate can be set there and therefore the loading can be acquired rapidly and effectively. In order to keep the magnitude of the necessary interventions in the load point distribution low, a load point spectrum can be defined. Here, the possibility is utilized that excessively low or excessively high torques of the internal combustion engine are compensated for by way of the electric motor in comparison with the propulsion requirement of the driver. For example, the performance of the internal combustion engine can be reduced and the electric motor can add the missing performance. Conversely, the performance of the internal combustion engine can be increased and the excess energy can be used by the electric motor 12 in the generator mode for charging the battery 21. The loading of the activated carbon 29 in the activated carbon container 14 with fuel vapors is determined, for example, with the aid of the lambda probe 28 (step 37), since the composition of the fuel/air mixture for the internal combustion engine is changed as a result of the fuel vapors being fed in. The loading of the activated carbon container which is determined in this way can be stored, for example, in an engine control unit. The acquiring operation can be maintained, for example, until a defined air mass has been fed via the tank ventilating means to the internal combustion engine and therefore reliable loading of the activated carbon container 13 has been detected. This can be stored in the engine control unit in addition to setting a flag indicating that the loading has been learned successfully (step 38). The flushing operating mode for acquiring the loading of the activated carbon container can then be ended in step 39 and the load distribution can be set again according to a general operating strategy of the hybrid vehicle 10 depending on the performance requirement of the driver.

The actual flushing of the activated carbon container 14 can then be carried out, as will be described in the following text with reference to FIG. 4. After the loading of the activated carbon container is known, a timer is started in step 41. In step 42, an operating point range which is suitable for flushing is set depending on the timer and the charging state of the activated carbon container 14. If an operating point of the internal combustion engine lies in the operating point range (step 43), the flushing operating mode is activated in step 44. Otherwise, the operating point range is broadened in step 42, possibly depending on the timer, with the result that a priority of the flushing operating mode rises as time passes. In an activated flushing operating mode (step 44), an intervention can be carried out in a targeted manner in step 45 in comparison with a conventional flushing strategy which depends substantially on the operating point of the internal combustion engine and the loading of the activated carbon container, by the operating point of the internal combustion engine being set in a targeted manner by way of the utilization of a load point shift in such a way that the flushing of the activated carbon container is optimized. Here, a load point spectrum can likewise be predefined, in order to keep the interventions by way of the load point shift low and in order to set favorable ranges for the overall degree of efficiency of the drivetrain. Here, a decision can be made in each case depending on the loading of the activated carbon container and the vehicle speed and therefore on the drive torque which is required by the driver as to whether targeted enhanced flushing of the activated carbon container is necessary. For example, a stopping ban can also be set for the internal combustion engine. By the priority of the activated carbon container flushing being increased as time passes without flushing in steps 43, 42, it is ensured that the degree of loading of the activated carbon container does not rise to such an extent that said activated carbon container threatens to overflow. During flushing, the degree of loading of the activated carbon container is continuously observed further in step 46, for example using the lambda probe, and the condition of successful reacquiring of the loading of the activated carbon container is set again in the engine electronics after throughput of a defined flushing mass (step 47). The flushing operating mode can then be ended in step 48, the load distribution can be set according to a performance requirement of the driver, and the timer can be started again in step 41.

Requirement-oriented flushing of the activated carbon container can therefore be realized, as a result of which the escape of fuel vapors into the environment can be prevented reliably even without the use of a pressurized tank and the hybrid drive of the vehicle is not impaired substantially. In particular, optimum flushing of the activated carbon container can be carried out by way of the load point shift, without a driver of the hybrid vehicle experiencing losses, for example with regard to consumption or comfort. In addition, consumption advantages can arise, since additional running times of the internal combustion engine can be avoided, since the flushing operating mode is preferably moved into operating ranges which correspond substantially to the drive strategy of the entire system in the case of a predefined propulsion requirement. Although the above-described method manages without a pressurized tank, it can likewise be used in concepts having a pressurized tank, since there is also the requirement here for effective and appropriate flushing of the activated carbon container.

LIST OF DESIGNATIONS

10 Hybrid vehicle
11 Internal combustion engine
12 Electric motor
13 Fuel tank
14 Activated carbon container
15 Control apparatus
16 Fuel line
17 Ventilating line
18 Line
19 Opening
20 Drive
21 Battery
22 Fuel
23 Intake section
24 Exhaust gas section
25 Injection line
26 Injection valve
27 Throttle valve
28 Lambda probe
29 Activated carbon
30 Valve
31-39 Step
41-48 Step Having described the invention, the following is claimed:

1. A method for operating a hybrid vehicle, the hybrid vehicle comprising at least one internal combustion engine with a fuel tank and a filter, and a motor for driving the hybrid vehicle, the filter being configured to absorb fuel vapors from the fuel tank in a filter operating mode and to emit the fuel vapors to the internal combustion engine in a flushing operating mode of the filter, the method comprising:
   detecting a current operating point of the internal combustion engine;
   determining a speed of the hybrid vehicle; and
   activating the flushing operating mode of the filter depending on the current operating point, the speed of the hybrid vehicle, and an operating time of the hybrid vehicle.

2. The method as claimed in claim 1, wherein the operating time of the hybrid vehicle comprises:
   an operating time since a previous activation of the flushing operating mode,
   an operating time since a previous start of the hybrid vehicle, or
   an operating time since a previous refueling operation of the fuel tank.

3. The method as claimed in claim 1, wherein the method further comprises:
   detecting a change in an operating parameter of the internal combustion engine while the flushing operating mode is active or while the flushing operating mode is activated, and
   determining a loading state of the filter depending on the change in the operating parameter.

4. The method as claimed in claim 3, wherein the flushing operating mode is activated depending on the loading state of the filter, which loading state was determined during a previous activation of the flushing operating mode.

5. The method as claimed in claim 3, wherein the method further comprises, during the active flushing operating mode:

setting a load distribution between the internal combustion engine and the motor depending on the loading state of the filter.

6. The method as claimed in claim 1, wherein the method further comprises, during the active flushing operating mode:
   setting a load distribution between the internal combustion engine and the motor depending on the operating time of the hybrid vehicle and/or depending on the current operating point.

7. The method as claimed in claim 1, wherein the activation of the flushing operating mode further comprises:
   determining an operating point range depending on the operating time of the hybrid vehicle, and
   activating the flushing operating mode if the current operating point lies in the operating point range.

8. The method as claimed in claim 1, wherein the method further comprises:
   detecting a driving performance requirement of a user of the hybrid vehicle made of the hybrid vehicle, and
   activating the flushing operating mode of the filter depending on the driving performance requirement.

9. A control apparatus for a hybrid vehicle, the hybrid vehicle comprising at least one internal combustion engine with a fuel tank and a filter, and a motor for driving the hybrid vehicle, the filter being configured to absorb fuel vapors from the fuel tank in a filter operating mode and to emit the fuel vapors to the internal combustion engine in a flushing operating mode of the filter, wherein the control apparatus is configured to:
   detect a current operating point of the internal combustion engine;
   determining a speed of the hybrid vehicle; and
   activate the flushing operating mode of the filter depending on the current operating point, the speed of the hybrid vehicle, and an operating time of the hybrid vehicle.

10. The control apparatus as claimed in claim 9, wherein the operating time of the hybrid vehicle comprises:
    an operating time since a previous activation of the flushing operating mode,
    an operating time since a previous start of the hybrid vehicle, or
    an operating time since a previous refueling operation of the fuel tank.

11. The control apparatus as claimed in claim 9, wherein the control apparatus is further configured to:
    detect a change in an operating parameter of the internal combustion engine while the flushing operating mode is active or while the flushing operating mode is activated, and
    determine a loading state of the filter depending on the change in the operating parameter.

12. The control apparatus as claimed in claim 11, wherein the flushing operating mode is activated depending on the loading state of the filter, which loading state was determined during a previous activation of the flushing operating mode.

13. The control apparatus as claimed in claim 11, wherein the control apparatus is further configured to:
    during the active flushing operating mode, set a load distribution between the internal combustion engine and the motor depending on the loading state of the filter.

14. The control apparatus as claimed in claim 9, wherein the control apparatus is further configured to:
    during the active flushing operating mode, set a load distribution between the internal combustion engine and the motor depending on the operating time of the hybrid vehicle and/or depending on the current operating point.

15. The control apparatus as claimed in claim 9, wherein the activation of the flushing operating mode further comprises:
    determining an operating point range depending on the operating time of the hybrid vehicle, and
    activating the flushing operating mode if the current operating point lies in the operating point range.

16. The control apparatus as claimed in claim 9, wherein the control apparatus is further configured to:
    detect a driving performance requirement of a user of the hybrid vehicle made of the hybrid vehicle, and
    activate the flushing operating mode of the filter depending on the driving performance requirement.

* * * * *